United States Patent [19]

Duran

[11] Patent Number: 4,854,795

[45] Date of Patent: Aug. 8, 1989

[54] SPRING FORM CAPTIVE PANEL FASTENER ASSEMBLY

[75] Inventor: John A. Duran, Glendora, Calif.

[73] Assignee: Avibank Mfg., Inc., Burbank, Calif.

[21] Appl. No.: 138,723

[22] Filed: Dec. 23, 1987

[51] Int. Cl.⁴ ............................................. F16B 21/18
[52] U.S. Cl. .................................. 411/352; 411/112; 411/508; 24/627
[58] Field of Search ............... 411/103, 107, 112, 347, 411/348, 351, 352, 353, 508, 970, 999; 403/406.1, 407.1; 24/627

[56] References Cited

U.S. PATENT DOCUMENTS

| | | | |
|---|---|---|---|
| 981,321 | 1/1911 | Smith | 411/320 |
| 994,726 | 6/1911 | Dorman | 411/352 |
| 2,179,604 | 11/1939 | Tinnerman | 411/352 |
| 2,718,252 | 9/1955 | Schuster | 411/946 |
| 3,085,222 | 4/1963 | Watts | 24/627 |
| 3,592,250 | 7/1971 | Petroshanoff | 411/320 |
| 3,645,160 | 2/1972 | Artioli et al. | 411/348 |
| 3,995,675 | 12/1976 | Cosenza . | |
| 4,069,855 | 1/1978 | Petroshanoff | 411/999 |
| 4,112,992 | 9/1978 | Wing | 411/946 |
| 4,119,131 | 10/1978 | Cosenza | 411/352 |

Primary Examiner—Neill R. Wilson
Attorney, Agent, or Firm—Poms, Smith, Lande & Rose

[57] ABSTRACT

A hold out spring is provided on a threaded bolt. The bolt is adapted to be inserted through a hole in a panel. The hold out spring is inserted into a bore in the bolt, riding in spaced diametrically opposed internal grooves therein, the hold out spring extending out of a slot in the bolt. A washer having inwardly extending tabs is now installed on the shank of the bolt, the tabs riding in grooves extending along the outer body of the bolt and stopped in their downward movement by engagement with a stop ring mounted in a groove adjacent the nose of the bolt.

13 Claims, 4 Drawing Sheets

U.S. Patent  Aug. 8, 1989  Sheet 1 of 4  4,854,795
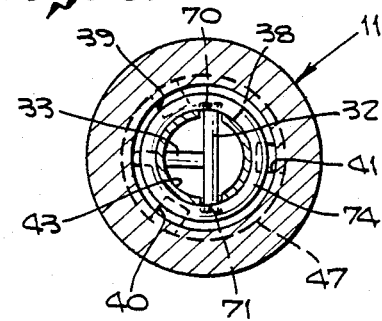
Fig. 6.
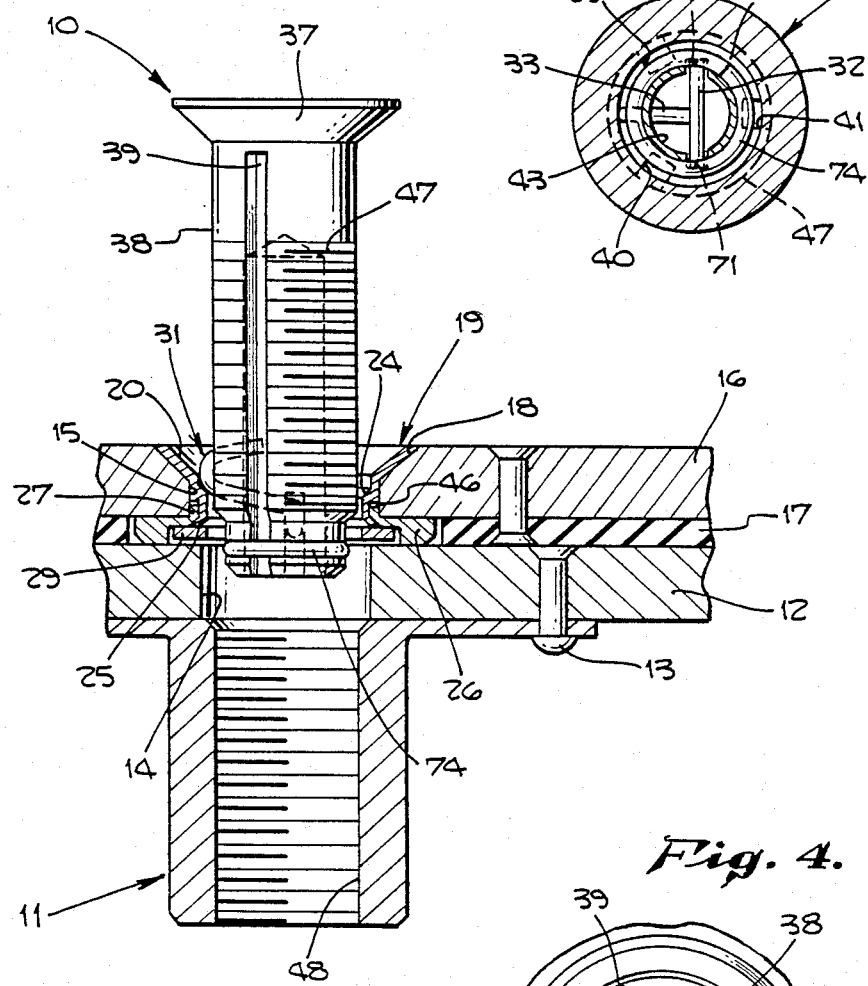
Fig. 1.
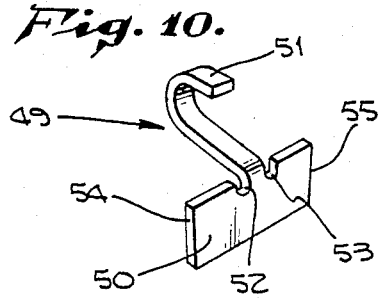
Fig. 10.
Fig. 4.

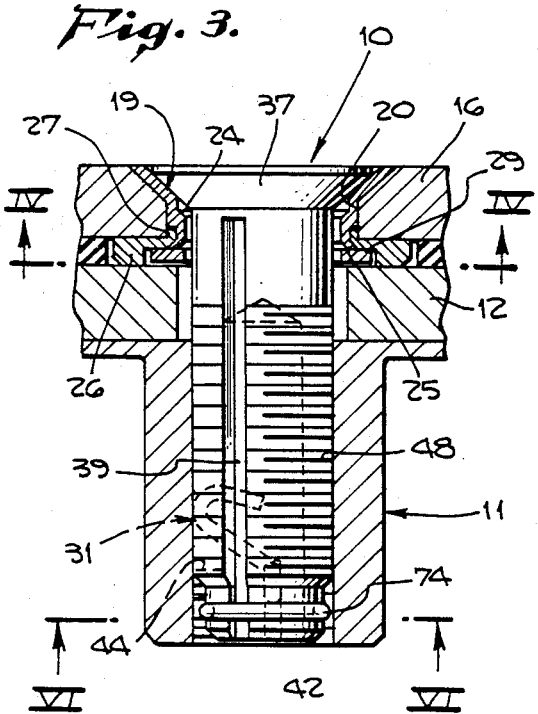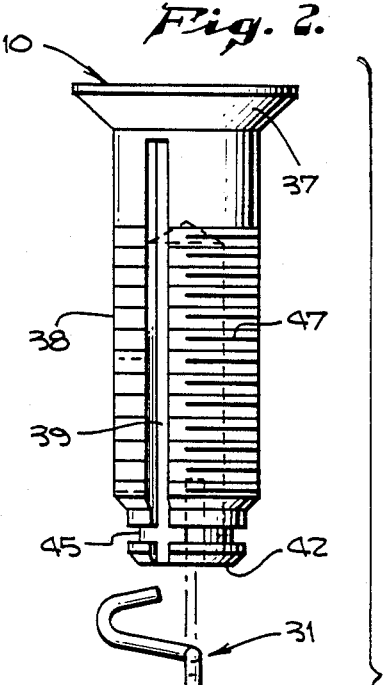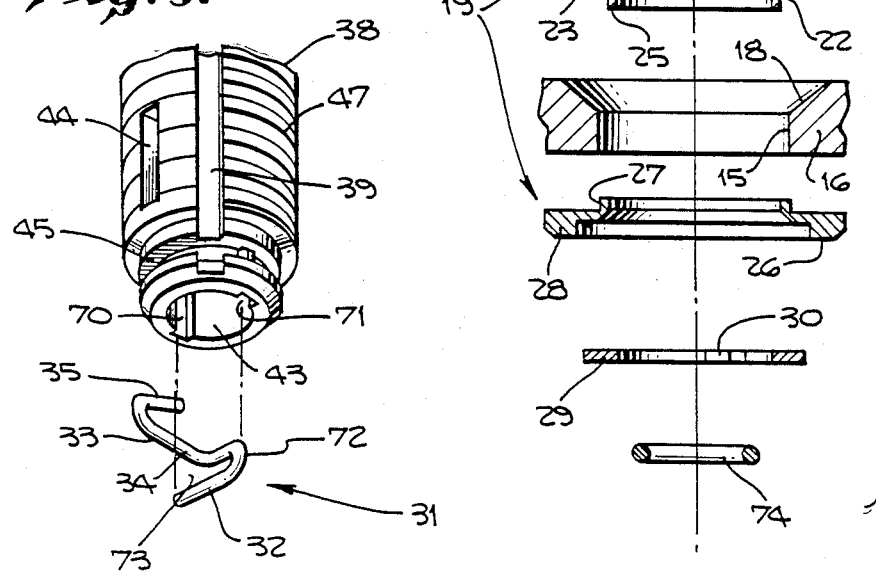

SPRING FORM CAPTIVE PANEL FASTENER ASSEMBLY

BACKGROUND OF THE INVENTION

1. Field of the Invention

The invention relates to panel fasteners; and, more particularly, to captive panel fasteners suitable for securement to aircraft panels or the like.

2. Description of the Prior Art

In U.S. Pat. No. 3,995,675 to Cosenza, there is described a captive panel fastener assembly wherein a retaining ring with inwardly extending tabs slidably ride along the body of a stud, the tabs entering splines extending lengthwise of the stud. A knurled plug is press-fit into a bore at the nose of the stud after insertion of the stud through a hole in a panel and after placement of the ring on the stud. This retains the ring to the stud and allows a more rigid and closely fitting retaining ring to be used as a captivating means of the stud to the panel. The retaining ring is more resistant to accidental displacement than more flexible retaining rings.

However, the knurl of the plug and its outer diameter must be very precisely manufactured and closely related to the bore diameter into which it is inserted. If it is not so precise, e.g., if it is oversized, the plug can blow up or expand the outer threads of the stud and the stud cannot then mate properly with a receptacle secured to a mating panel. If the plug is undersized, it will fall out and may possibly be sucked up into the engine of the aircraft causing serious damage. If it falls out where sophisticated hardware or electronic equipment is present, it may interfere with the same or cause damage thereto.

Further, the plug in U.S. Pat. No. 3,995,675 has an enlarged shoulder or stop portion which abuts against the area surrounding the bore opening. If this portion is not perfectly concentric with the shaft of the stud, it might interfere with the minor diameter of the thread of the stud and a nut or receptacle would not be able to threadably mate with the stud. Finally, in installing the plug in U.S. Pat. No. 3,995,675, a large axial force is necessary to install the knurled barrel portion all the way into the bore hole.

In my copending application Ser. No. 07/138,513, filed 12/23/87 commonly assigned, I disclose a combination stop ring and hold out spring for a panel fastener assembly. However, it is not necessary that the stop ring be integral with the spring form hold out portion. The plug of U.S. Pat. No. 3,995,675 can be eliminated retaining the advantages of the hold out spring portion by using a conventional stop ring.

In U.S. Pat. Nos. 4,069,855 and 4,119,131 to Petroshanoff, spring members are disclosed entirely contained within the bore of a bolt having a curved portion extending out of a slot through the body of the bolt. There is no firm positive coupling of the springs to the bolt body and these springs can lose their resiliency and fall out of the bolt body upon vibration and the like.

There is thus a need for a captive panel fastener that allows the use of rigid and close fitting retaining rings on bolts or studs which captivate the bolt or stud to a panel without a separate plug or without means that might fall out or interfere with the outer threads of the bolt or stud.

SUMMARY OF THE INVENTION

It is an object of this invention to provide a captivated bolt retaining ring which will not become displaced after installation and is rigid and close fitting to the bolt.

It is a further object of this invention to provide a retaining ring on such panel fastener which can be installed without deformation of the threads of the bolt.

It is another object of this invention to provide a retaining ring captivated to the bolt by a stop ring on the bolt.

It is still another object of this invention to provide a retaining ring captivated to a bolt without any parts that can become loss, fall out or interfere with the bolt outer threads.

These and other objects are preferably accomplished by providing a hold out spring and stop ring on a threaded bolt. The bolt is adapted to be inserted Q through a hole in a panel. The hold out spring is inserted into a bore in the bolt and aligned thereto by internal slots in the bolt, the hold out spring extending out of a slot in the bolt. A washer having inwardly extending tabs is now installed on the shank of the bolt, the tabs riding in grooves extending along the outer body of the bolt and stopped in their downward movement by engagement with a stop ring mounted in a groove adjacent the nose of the bolt.

BRIEF DESCRIPTION OF THE DRAWING

FIG. 1 is an elevational view, partly in cross-sectional, showing the bolt captivated to a panel;

FIG. 2 is an exploded view of the bolt assembly and grommet assembly of FIG. 1;

FIG. 3 is an elevational view, partly in section, of the bolt assembly of FIG. 1 in a position engaging a receptacle on the abutting panel;

FIG. 4 is a view taken along lines IV—IV of FIG. 3;

FIG. 5 is an exploded view of a portion of the bolt of FIGS. 1 to 4 and the spring prior to assembly of the spring to the bolt;

FIG. 6 is a view taken along lines VI—VI of FIG. 3;

FIG. 10 is a perspective view of a modified spring in accordance with the invention.

DESCRIPTION OF THE PREFERRED EMBODIMENT

Figure 7:
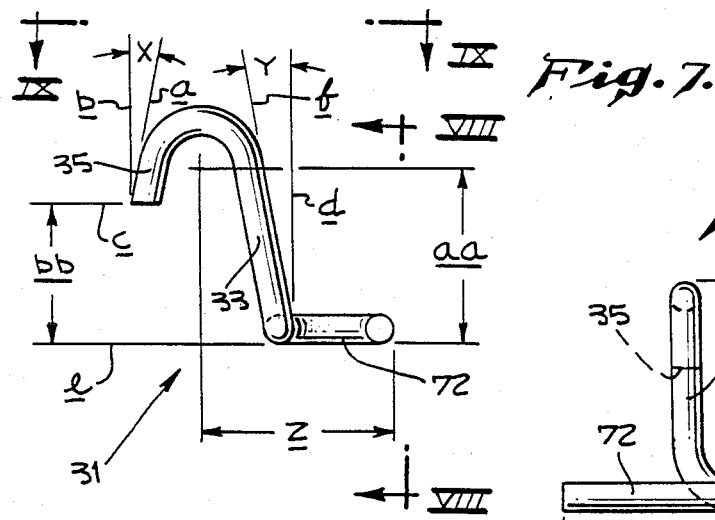
FIG. 7 is a front elevational view of the spring alone of FIGS. 1 to 6.

Referring now to FIG. 1 of the drawing, a bolt 10 is shown adapted to mate with a receptacle assembly 11. Receptacle assembly 11 may be of any suitable type, as for example, the assembly 12 described in my copending application Ser. No. 927,320, filed Nov. 4, 1986, now pending, the teachings of which are incorporated herein by reference. Receptacle assembly 11 herein is secured to subpanel 12 by rivets 13 or the like. A hole 14 is provided in subpanel 12 coincident with a hole 15 in main panel 16 and a resilient gasket 17 may optionally be provided between panels 12 and 16.

As seen in FIG. 1, a tapered countersunk 18 leads into opening 15 in panel 16. As seen in FIG. 2, a two piece grommet assembly 19 is provided. First upper portion 20 has a conically shaped portion 21 and an integral lower generally cylindrical portion 22. An enlarged area 23 surrounds the exterior of upper portion 20 between portions 21 and 22 and an annular cut-out area 24 is provided on the inner wall of upper portion 20 at the intersection of portions 21 and 23. It can be seen in FIG. 2 that grommet portion 20 terminates at bottom in a thin-walled end 25.

Grommet assembly 19 further includes a lower grommet portion 26 having an upper generally cylindrical portion 27 and a lower generally enlarged portion 28.

A rigid retaining ring 29 (see also FIG. 4) is provided having a plurality, such as three, of inwardly extending tabs or ears 30. A hold out spring 31 is provided, of generally a single piece of spring material, having a lower generally U-shaped portion 32 (see also FIG. 5) with an upwardly extending upper portion 33. Upper portion 33 extends first upwardly at portion 34 from and integral with ring portion 32, then curves back on itself and outwardly at first curved portion 35.

Bolt 10 is best shown in FIG. 2 wherein bolt 10 has a tapered enlarged head 37, an elongated shank 38, and a plurality, such as three, of spaced elongated slots 3941 (see also FIG. 4). It is noted that slots 39 to 41 extend from a point adjacent the underside of head 37 all the way along and through the bolt shank 38 through tapered nose 42 thereof. Bolt shank 38 is bored out in the interior to form a cavity 43 (FIG. 3) and a through slot 44 (FIG. 5) is provided through the wall of shank 38. An annular groove 45 is provided adjacent nose 42.

A pair of elongated grooves 70, 71 (see particularly FIG. 6) are provided on the inner wall of cavity 43 diametrically opposite each other.

Figure 8:
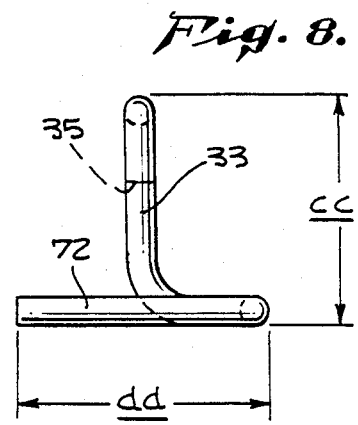
FIG. 8 is a side elevational view of the spring of FIG. 7.
Figure 9:
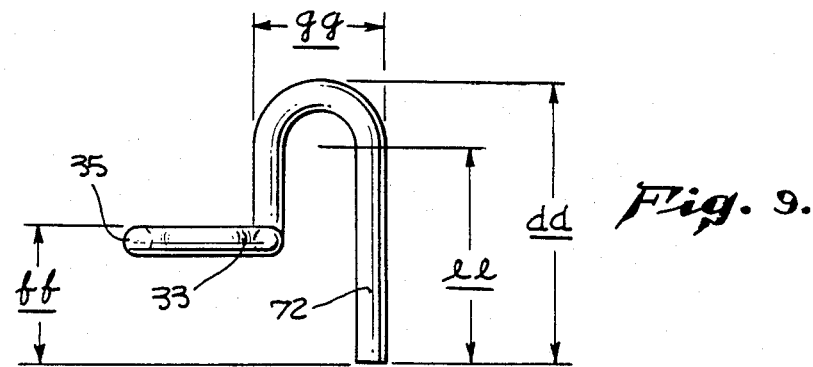
FIG. 9 is a bottom view of the spring of FIG. 7.

As seen in FIG. 7, the curved portion 35 of spring 31 preferably makes an angle X of about 10° with respect to the angle formed between line a tangential to portion 35 and line b extending normal to line c. Portion 33 also preferably makes an angle y of about 10° with respect to the angle formed between line d extending normal to base line e and line f tangential to portion 33. Spring 31 may of course be any suitable dimensions relative to the dimensions of bolt 10. For example, the distance z in FIG. 7 may be about 0.134 inches, the height aa may be about 0.12 inches, the height bb may be between about 0.080 to 0.082 inches and the radius of curvature of curved portion 35 may be about 0.043 inches. As seen in FIG. 8, the height cc may be between about 0.160 to 0.165 inches and the distance dd may be about 0.176 inches. The radius of curvature where portion 33 joins portion 32 may be about 0.020 inches. As seen in FIG. 9, the height ee may be about 0.150 inches and the height ff may be about 0.088 inches. The distance gg may be between about 0.081 to 0.091 inches. Wire of about 0.020 inches in diameter may be used.

The assembly of the components of FIG. 2 will now be described. As discussed in detail in my copending application Ser. No. 07/138 513, filed 12/23/87, the teachings of which are incorporated herein by reference, upper grommet portion (FIGS. 1 and 3) 20 is inserted into hole 15 in panel 16 from the access side thereof and lower grommet portion 26 is inserted from the blind side with upper portion 27 disposed in the area formed between lower cylindrical portion 22 and the walls of panel 16 forming opening 15. As seen in FIGS. 1 and 3, end 25 of lower portion 22 is swaged against portion 27 to securely hold the grommet assembly 19 to panel 16. The spacing or area, if any, 46 between the lower surface of portion 23 and the upper surface of portion 26, as indicated at numeral 46 in FIG. 1, allows for varying panel thicknesses.

Bolt 10 is inserted through grommet assembly 19 and washer 29 is now assembled to the shank 38 of bolt 10 by merely placing washer 29 onto bolt 10 with tabs or ears 30 riding in slots 39 to 41. Spring 31 is now inserted into bore 43 by sliding bight portion 72 into groove 71 (FIG. 5) and the portion of spring 31 indicated by reference numeral 73 in groove 10 until curved portion 35 snaps or exits out of slot 44 as seen in FIGS. 1 and 3. Stop ring 74 (FIG. 2) is now snapped into groove 45 as seen in FIGS. 1 and 3. Washer 29 cannot move past ring 74. The final assembled position is shown in FIGS. 1 and 3. It can be seen in FIG. 1 that the curved portion 35 of resilient spring 31 rests into the cut-out area 24 of grommet assembly 19 thus holding bolt 10 in an out position with respect to panel 16. Bolt 10 can be merely pushed with spring 31 moving inwardly so that the outer threads 47 of bolt 10 can mate with the internal threads 48 of receptacle assembly 11 as is well known in the art. The washer 29 can be assembled before or after assembly of spring 31 since, if assembled after insertion of spring 31, it would merely push spring 31 inwardly into the inferior of cavity 43, then spring back out of slot 44 after washer 29 passes thereover.

Cut-out area 24 is thus a counterbore into which the outwardly extending curved portion of spring 31 detents into when installed as seen in FIG. 1. In order to standardize spring 31 and its location in bolt 10, area 24 will always remain in the same position in relation to the blind side of panel 16. That is, area 24 and grommet portion 20 will vary in thickness depending upon the thickness of panel 16. However, a constant dimension is maintained between the depth of area 24 and the terminal flat bottom of the lower flat portion of grommet portion 26.

Figure 12:
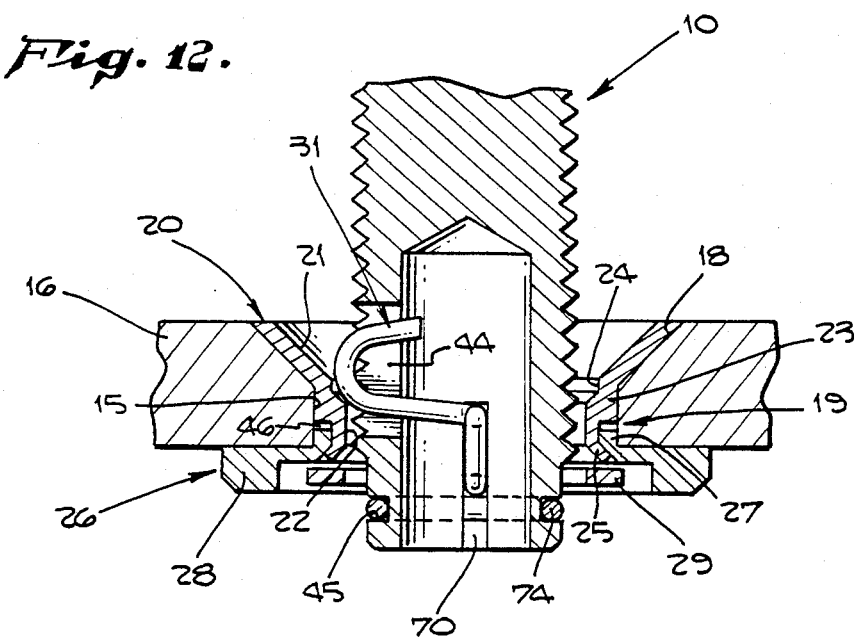
FIG. 12 is an elevational view similar to FIG. 1 with parts omitted for convenience of illustration.
Figure 13:
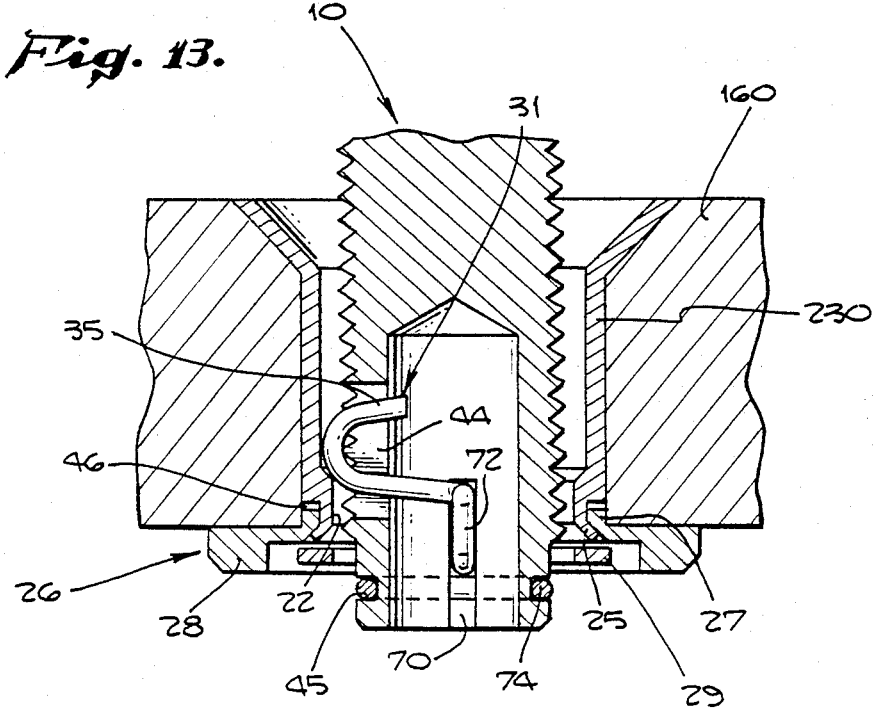
FIG. 13 is a view similar to FIG. 12 showing the apparatus thereof installed in a thicker panel.

Thus, as seen in FIG. 12, distance A is shown between counterbore or area 24 and the bottom of portion 28. However, if a thicker main panel is used, such as panel 160 in FIG. 13 wherein like numerals refer to like parts of FIG. 12, the portion 230 is made longer than portion 23 to accommodate the increased thickness of panel 160 while the distance A remains the same allowing standardization of the spring 36 and its location. This constant dimension ensures a proper detent force on spring 36. Gap 46 between portions 23 and 26 compensates for variation in the panel thickness.

It can thus be seen that hold out means is provided for holding bolt out from panel 16. Also, as seen in FIG. 6, after installation of spring 31 and ring 74, ring 74 prevents spring 31 from coming out of the bolt body.

Although a particular type of hold out spring has been disclosed, which may be circular in cross-section throughout, as seen in FIG. 10, a hold out spring 49 is shown having a flat, generally rectangular base 50, and an outwardly extending integral portion which extends first outwardly, then back to form a curved or hook portion 51. Spring 49 may be stamped or otherwise formed out of a single piece of resilient metallic material so that undercut portions 52, 53 are formed in both sides of the portion 51. The assembly of spring 49 to bolt 10 is identical to the assembly of spring 31 to bolt 10 described with respect to the embodiment of FIGS. 1 to 6, and to the installed grommet assembly 19. That is, the side or end portions 54, 55 enter and slide in grooves 70, 71 (FIG. 6) respectively.

Figure 11:
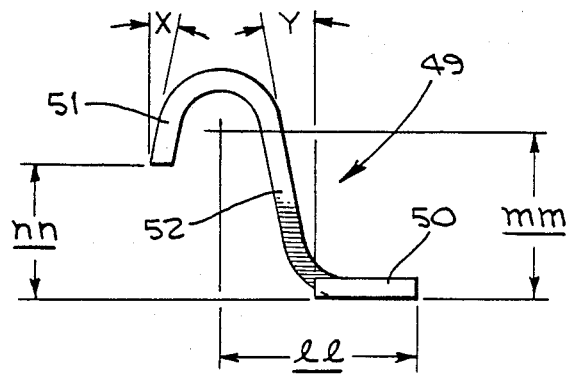
FIG. 11 is a front vertical view of the spring of FIG. 10.

The base 50 of spring 49 may be about 0.176 inches long with a height of between about 0.081 to 0.091 inches. The width of portion 52 may be about 0.020 inches and the length between about 0.156 to 0.161 inches. The radius of curvature of portions 52, 53 may be about 0.010 inches, the width thereof being about 0.010 inches and about 0.020 inches deep. The material of spring 49 may be about 0.016 inches in thickness. As seen in FIG. 11, distance ee may be about 0.134 inches with height mm about 0.116 inches. Height nn may be between about 0.076 to 0.078 inches. Portion 52 may have a radius of curvature from portion 50 of about 0.020 inches and the radius of curvature of portion 51 may be about 0.043 inches. The angles x and y are identical to angles x and y of spring 31 (see FIG. 7 - thus, about 10°).

In both embodiments, the washer 29 can be a rigid and close fitting washer and is retained to the bolt 10 by engagement with stop ring 74. There is no need to machine grooves or slots that must terminate at some point along the bolt body; grooves or slots 39 to 41 extend all the way through the nose of the bolt.

The unique two piece grommet assembly compensates for varying door or panel thicknesses and is swaged against itself, not directly against the door or panel. This is particularly important in doors or panels of composite materials where stress thereon is to be avoided. The washer is engaged with the bolt slots by merely sliding the same thereon without need of special tools. The stop ring 74 on both embodiments retains the washer to the bolt. The cut-out area of the unique two piece grommet assembly, which compensates for varying door or panel thicknesses, provides an area into which the curved portion of the hold out spring rests allowing proper engagement therewith. No added parts for retaining the washer to the bolt-spring assembly are required.

Although there is described certain embodiments of the invention, the invention is not to be limited to the particular embodiments described but only to the scope of the invention set forth in the appended claims.

I claim:

1. In a captive panel fastener assembly comprising a bolt having an enlarged head at one end and a nose at the other end, a threaded shank on said bolt between said nose and said head, the improvement comprising:
   a plurality of slots extending along said shank through the nose of said bolt;
   a rigid washer having a plurality of inwardly extending tabs riding in said slots, the total number thereof being related to the total number of said slots;
   an annular groove in said bolt adjacent the nose of said bolt and extending into the path of said slots;
   an internal bore in said bolt extending from said nose to a point remote from said head with at least a pair of diametrically opposed grooves formed on the inner wall of said bore extending from said nose upwardly into said bore;
   a bore slot in the wall of said bore communicating the interior of said bore with the exterior of said bolt;
   a hold out spring having an elongated portion fitting into said grooves in said inner wall of said bore with an integral hook portion extending out of said bore slot beyond the outer surface of said bolt, said washer being disposed between said curved portion and said ring portion, the downward movement of said washer off of said bolt being arrested by engagement of said washer with a stop ring mounted in said annular groove.

2. In the assembly of claim 1 wherein said spring has an upwardly extending vertical portion extending from a U-shaped portion, said U-shaped portion comprising said elongated portion with said hook portion curving from said elongated portion.

3. In the assembly of claim 2 wherein said spring is circular in cross-section.

4. In the assembly of claim 1 wherein said spring has a flat generally rectangular integral portion forming said elongated portion with a second elongated portion extending from generally the midpoint of said rectangular portion then curving back to form said hook portion.

5. In the assembly of claim 4 wherein said spring is rectangular in cross-section.

6. In the assembly of claim 5 wherein said spring is formed from a single piece of planar metallic material.

7. In a captive panel fastener assembly mounted in a grommet assembly mounted in a hole through a panel, the panel having a countersunk on the access side thereof, said grommet assembly having an outwardly flared tapered portion conforming to said hole and a bolt having an enlarged head with a tapered portion conforming to said tapered portion of said grommet assembly, and a threaded shank extending from said head terminating in a nose, the improvement comprising:
   a plurality of slots extending along said shank through the nose of said bolt;
   a rigid washer having a plurality of inwardly extending tabs riding in said slots, the total number thereof being related to the total number of said slots;
   an annular groove in said bolt adjacent the nose of said bolt and extending into the path of said slots;
   an internal bore in said bolt extending from said nose to a point remote from said head with at least a pair of diametrically opposed grooves formed on the inner wall of said bore extending from said nose upwardly into said bore;
   a bore slot in the wall of said bore communicating the interior of said bore with the exterior of said bolt;
   a hold out spring having an elongated portion fitting into said grooves in said inner wall of said bore with an integral hook portion extending out of said bore slot beyond the outer surface of said bolt adapted to bear against said grommet assembly when the head of said bolt is pulled away from said panel, and adapted to abut against the portion of said grommet assembly on the blind side of panel, the downward movement of said washer off of said bolt being arrested by engagement of said washer with a stop mounted in said annular groove.

8. In the assembly of claim 7 wherein said spring has an upwardly extending vertical portion extending from a U-shaped portion, said U-shaped portion comprising said elongated portion with said hook portion curving from said elongated portion.

9. In the assembly of claim 8 wherein said spring is circular in cross-section.

10. In the assembly of claim 9 wherein said spring has a flat generally rectangular portion forming said elongated portion with a second elongated portion extending from generally the midpoint of said rectangular portion then curving back to form said hook portion.

11. In the assembly of claim 10 wherein said spring is rectangular in cross-section.

12. In the assembly of claim 11 wherein said spring is formed from a single piece of planar metallic material.

13. In the assembly of claim 7 wherein said grommet assembly is counterbored on the inner surface thereof where said curved portion bears against.

* * * * *